(12) United States Patent
Lou (10) Patent No.: US 10,612,616 B1
(45) Date of Patent: Apr. 7, 2020

(54) FIXED PROFILE ENERGY ATTENUATOR

(71) Applicant: Armorworks Holdings, Inc., Chandler, AZ (US)

(72) Inventor: Ken-An Lou, Phoenix, AZ (US)

(73) Assignee: Armorworks Holdings, Inc., Chandler, AZ (US)

( * ) Notice: Subject to any disclaimer, the term of this patent is extended or adjusted under 35 U.S.C. 154(b) by 58 days.

(21) Appl. No.: 15/802,236

(22) Filed: Nov. 2, 2017

(51) Int. Cl.
*F16F 7/12* (2006.01)
*B60N 2/427* (2006.01)
*B60N 2/42* (2006.01)

(52) U.S. Cl.
CPC .......... *F16F 7/123* (2013.01); *B60N 2/42709* (2013.01); *B60N 2/4242* (2013.01); *B60N 2/42736* (2013.01); *F16F 2228/066* (2013.01); *F16F 2232/08* (2013.01); *F16F 2236/04* (2013.01)

(58) Field of Classification Search
CPC ............. F16F 2228/066; F16F 2232/08; F16F 2236/04; F16F 7/12; F16F 7/125; F16F 7/126; F16F 7/123; F16F 9/48; B60R 19/34; B60R 19/18; B60R 2019/1813; B60N 2/4242; B60N 2/42709; B60N 2/42; B60N 2/42736; B60N 3/048; B64D 11/0619
See application file for complete search history.

(56) References Cited

U.S. PATENT DOCUMENTS

| | | | |
|---|---|---|---|
| 3,194,355 A * | 7/1965 | Jeromson, Jr. | F16F 9/003 138/30 |
| 3,985,388 A * | 10/1976 | Hogan | B60N 2/163 297/216.17 |
| 4,204,659 A * | 5/1980 | Phillips | B64D 25/04 188/376 |
| 4,720,139 A * | 1/1988 | McSmith | B60N 2/4214 188/373 |
| 5,558,301 A | 9/1996 | Kerdoncuff et al. | |

(Continued)

OTHER PUBLICATIONS

Stanley P. Desjardins, The Evolution of Energy Absorption Systems for Crashworthy Helicopter Seats, Journal of The American Helicopter Society—J Amer Helicopter Soc. 51 . . . 10.4050/JAHS.51.150.

*Primary Examiner* — Bradley T King
*Assistant Examiner* — Mahbubur Rashid
(74) *Attorney, Agent, or Firm* — James L Farmer (57) ABSTRACT

Methods and apparatus are provided for a shock attenuation device configured to operate between a structure and a mass that is supported by and moveable relative to the structure in a guided manner along a stroking direction. In one embodiment, a notch load portion is configured to provide a resisting force to relative displacement of the supported mass over a first stage stroking distance according to a predefined load profile that includes a spike load peaking at a first threshold load value at the onset of relative displacement, and a substantially constant notch load for a remainder of the first stage stroking distance. A constant load portion arranged serially with the notch load portion is configured to provide a substantially constant resisting force to displacement of the supported mass at a second threshold load value over a second stage stroking distance, wherein the second threshold load value is higher than the first threshold load value.

16 Claims, 4 Drawing Sheets

(56) References Cited

U.S. PATENT DOCUMENTS

| | | | | |
|---|---|---|---|---|
| 5,636,866 A * | 6/1997 | Suzuki | B60R 21/04 | 188/376 |
| 5,685,603 A * | 11/1997 | Lane, Jr. | B60N 2/2821 | 297/216.11 |
| 5,788,185 A * | 8/1998 | Hooper | B64D 11/0619 | 244/118.6 |
| 6,179,380 B1 * | 1/2001 | Hoffman | B60N 2/4242 | 297/216.1 |
| 6,398,285 B2 * | 6/2002 | Motozawa | B60N 2/4221 | 296/68.1 |
| 6,585,190 B2 * | 7/2003 | Mort | B64D 11/06 | 244/122 R |
| 6,719,369 B1 * | 4/2004 | Wagner | B60N 2/2812 | 297/216.16 |
| 7,070,236 B2 * | 7/2006 | Kawashima | B60N 2/4228 | 297/216.1 |
| 7,611,197 B2 * | 11/2009 | Mattes | B60N 2/42736 | 297/216.14 |
| 7,744,155 B2 * | 6/2010 | List | B60P 7/18 | |
| 7,938,485 B1 | 5/2011 | Perciballi et al. | | |
| 8,087,723 B2 * | 1/2012 | Honnorat | B60N 2/4221 | 296/68.1 |
| 8,226,163 B1 * | 7/2012 | Pearson | B60N 2/42709 | |
| 8,342,300 B2 | 1/2013 | Guillon | | |
| 8,403,410 B1 | 3/2013 | Pinger et al. | | |
| 8,550,553 B1 | 10/2013 | Clark et al. | | |
| 8,561,748 B1 | 10/2013 | Hahn et al. | | |
| 8,678,465 B1 | 3/2014 | Aragon et al. | | |
| 8,840,163 B1 * | 9/2014 | Wilhelm | A61G 3/085 | 296/19 |
| 8,939,502 B2 | 1/2015 | Grant et al. | | |
| 9,096,146 B2 * | 8/2015 | Hoyle | B60N 2/20 | |
| 9,132,753 B1 | 9/2015 | Campbell | | |
| 9,221,361 B1 | 12/2015 | Platt et al. | | |
| 9,630,550 B1 * | 4/2017 | Perciballi | B60P 7/18 | |
| 9,969,307 B1 * | 5/2018 | Bosen | B60N 2/42709 | |
| 2004/0183344 A1 * | 9/2004 | Glance | B60N 2/012 | 297/216.1 |
| 2008/0156602 A1 * | 7/2008 | Hiemenz | B60N 2/4242 | 188/267.1 |

\* cited by examiner

FIXED PROFILE ENERGY ATTENUATOR

TECHNICAL FIELD AND BACKGROUND

The technical field of the present invention relates to energy attenuation technology for reducing the severity of shock loads experienced by an object or person during a high energy impact event. The technical field may further relate to the incorporation of such technology in land vehicle, watercraft, and aircraft seating systems.

DESCRIPTION OF THE EMBODIMENTS

The instant invention is described more fully hereinafter with reference to the accompanying drawings and/or photographs, in which one or more exemplary embodiments of the invention are shown. This invention may, however, be embodied in many different forms and should not be construed as limited to the embodiments set forth herein; rather, these embodiments are provided so that this disclosure will be operative, enabling, and complete. Accordingly, the particular arrangements disclosed are meant to be illustrative only and not limiting as to the scope of the invention. Moreover, many embodiments, such as adaptations, variations, modifications, and equivalent arrangements, will be implicitly disclosed by the embodiments described herein and fall within the scope of the present invention.

Although specific terms are employed herein, they are used in a generic and descriptive sense only and not for purposes of limitation. Unless otherwise expressly defined herein, such terms are intended to be given their broad ordinary and customary meaning not inconsistent with that applicable in the relevant industry and without restriction to any specific embodiment hereinafter described. As used herein, the article "a" is intended to include one or more items. Where only one item is intended, the term "one", "single", or similar language is used. When used herein to join a list of items, the term "or" denotes at least one of the items, but does not exclude a plurality of items of the list.

For exemplary methods or processes of the invention, the sequence and/or arrangement of steps described herein are illustrative and not restrictive. Accordingly, it should be understood that, although steps of various processes or methods may be shown and described as being in a sequence or temporal arrangement, the steps of any such processes or methods are not limited to being carried out in any particular sequence or arrangement, absent an indication otherwise. Indeed, the steps in such processes or methods generally may be carried out in various different sequences and arrangements while still falling within the scope of the present invention.

Additionally, any references to advantages, benefits, unexpected results, or operability of the present invention are not intended as an affirmation that the invention has been previously reduced to practice or that any testing has been performed. Likewise, unless stated otherwise, use of verbs in the past tense (present perfect or preterit) is not intended to indicate or imply that the invention has been previously reduced to practice or that any testing has been performed.

Figure 1:
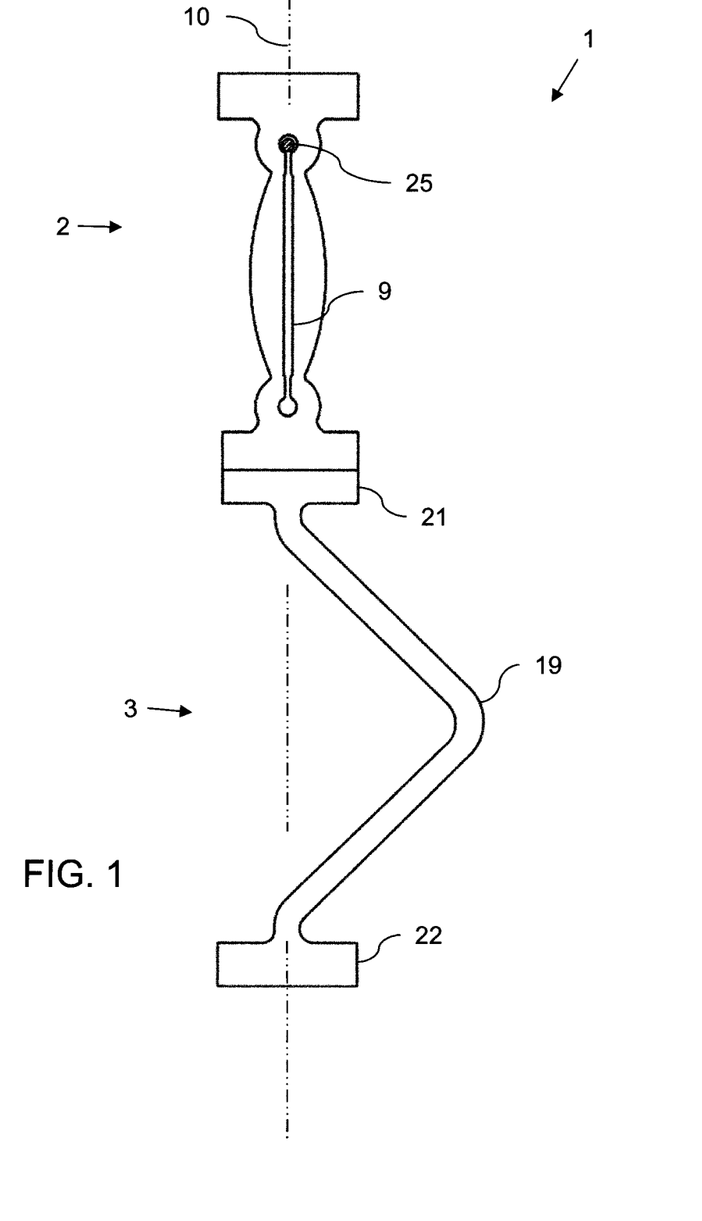
FIG. 1 is a plan view of an exemplary fixed profile energy attenuating device in accordance with the present disclosure.

An exemplary fixed profile energy attenuating ("EA") mechanism or device in accordance with the present disclosure is indicated generally at reference numeral 1 in the drawing Figures. Referring initially to FIG. 1, the EA device comprises a notch load portion 2 serially arranged with a fixed, or constant load portion 3, such that an external load applied to the EA device is carried by both portions simultaneously. As discussed in more detail below, the notch load portion 2 is configured to resist an externally applied impulse with a notch-shaped load profile, while the constant load portion 3 is configured to resist with a fixed load.

The constant load portion 3 may be any type of energy attenuating device configured or tuned to resist an external load with a constant force when the external load reaches a threshold value, yet remain rigid and undeformed for any load below that amount. In one embodiment the constant load portion 3 is a crushable or extensible metal construction that attenuates energy through plastic (or permanent) deformation of the metal. The depicted embodiment is a known configuration sometimes referred to as an "EA link" consisting of a deformable member 19 in the form of a metal bar integrally disposed between upper and lower flanges 21, 22. In one particular embodiment the deformable member 19 is an angular bar formed in a sideways letter "V" shape as shown.

The constant load portion 3 may be custom tailored to any particular application by modifying material properties, thicknesses, and/or shapes. In one exemplary implementation the constant load portion 3 is configured to effectively attenuate road shock loads transmitted through a vehicle chassis structure of at least 10 G's vertical, while supporting a 95th weight percentile seat occupant.

Examples of additional EA devices and components suitable for constant load portion 3 are disclosed in U.S. Pat. Nos. 7,938,485, 8,403,410, 8,678,465, and D657,312, all of which are assigned to the assignee of the instant invention, and hereby incorporated by reference. Alternatively, the constant load portion 3 may comprise any other crushable or extensible EA structure known in the art, such as crush tubes, inversion tubes, metal shearing or tearing devices, and the like. Although deformable EA devices such as the depicted EA link may be configured to protect a seated occupant for multiple impact events, they are generally considered disposable and easily replaced to restore a maximum level of protection.

Figure 2:
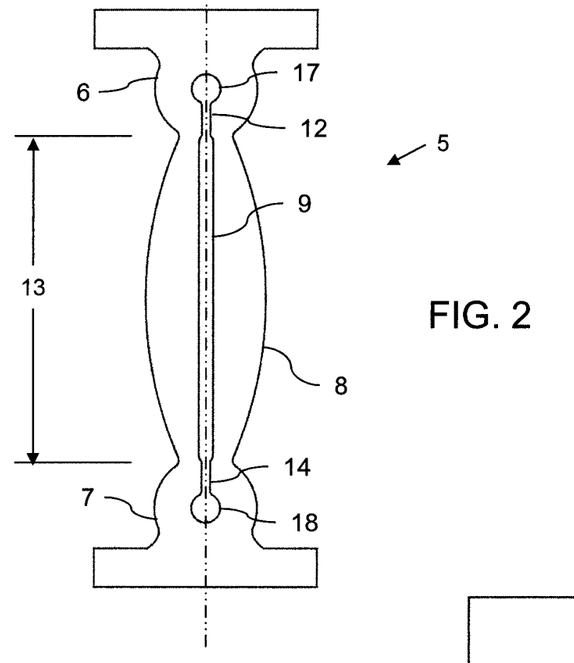
FIG. 2 is a plan view of the notch load portion of the energy attenuating device of FIG. 1.

Referring now also to FIG. 2, the depicted notch load portion 2 comprises essentially an elongated frame 5 with an upper end 6, a lower end 7, and a slot 9 along a principal, or longitudinal axis 10 that symmetrically divides the frame into left and right halves, and defines a stroking direction or path of the EA mechanism. Slot 9 may include an entry zone 12 at an upper end of the slot, an exit zone 14 at a lower end of the slot, and a notch load zone 13 spanning the frame between the entry and exit zones. The notch load zone 13 is longer than the entry or exit zones 12, 14, and in one particular embodiment the notch load zone is between 5 and 20 times longer than either of the entry or exit zone. The slot 9 terminates at upper and lower mandrel cavities 17, 18 in the upper and lower ends 6, 7 of the frame. Alternatively, the slot may simply terminate in the lower end of the frame without an exit zone or a lower mandrel cavity.

The width of the slot in the notch load zone 13 is greater than the width of the slot in the entry zone 12 and optional exit zone 14, and the width or diameter of the mandrel cavities 17, 18 is greater than the width of the notch load zone 13. In one embodiment the upper mandrel cavity is sized to receive a mandrel without interference. A contoured outside edge 8 defines an overall shape of the frame, and determines the width of each side at any position along the length of the slot. Frame 5 may be made from flat material, such as metal plate stock, with a uniform thickness measured in a direction perpendicular to the plane of the drawings.

Figure 3:
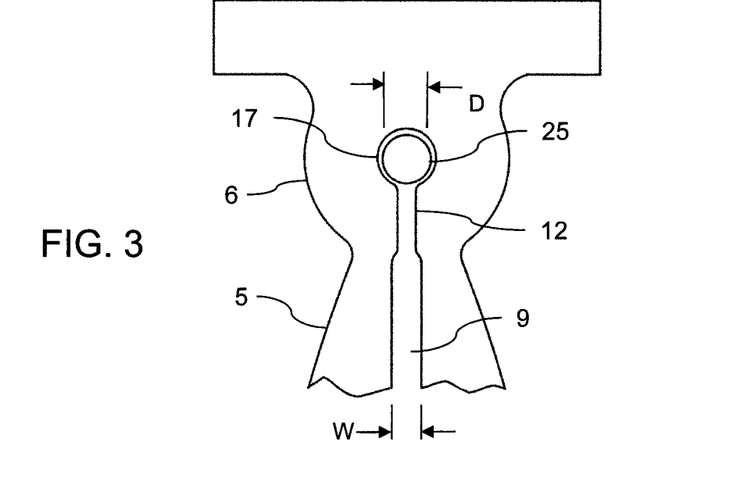
FIG. 3 is a detailed view of the upper end of the notch load portion of the energy attenuating device.

Referring now also to FIG. 3, the EA mechanism 1 further includes a mandrel 25 that works in conjunction with the notch load portion 2 of the EA mechanism. The mandrel is initially positioned in the upper mandrel cavity 17 adjacent the entry zone 12. The mandrel 25 may have a thickness as measured in a direction perpendicular to the plane of the drawings that is approximately equal to or greater than the thickness of the notch load portion 2. The diameter of the mandrel (or width if not round), indicated at letter "D", is greater than the width of slot 9, indicated at letter "W". In the depicted embodiment the mandrel is a round bar, generally made of a hard material, such as steel, that is substantially incompressible and undeformable by the frame and slot. Consequently, in order for the mandrel to advance into the slot from the upper mandrel cavity 17, the slot 9 must be forcibly widened. The mandrel may have an attachment feature such as a flange at one or both ends for securing it to a structure or mass.

Figure 4A:
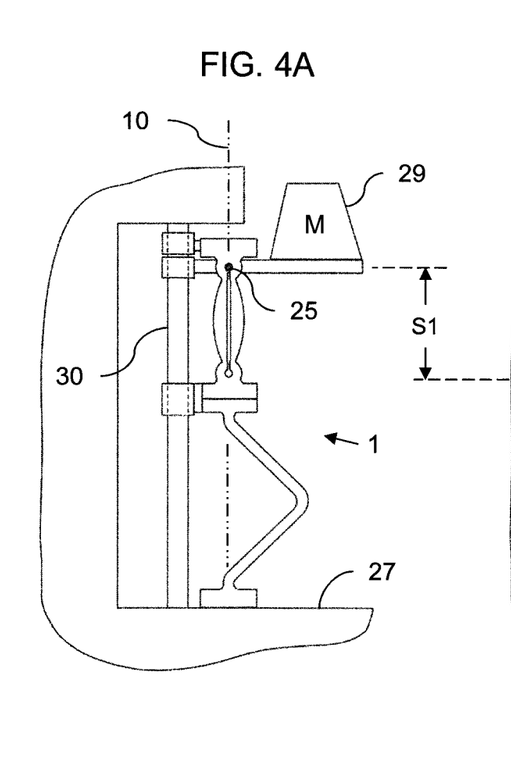
FIG. 4A is a schematic representation of an installed energy attenuating device mounted in a load path between a mass and a structure, and a guide system constraining motion to a stroking direction.
Figure 4B:
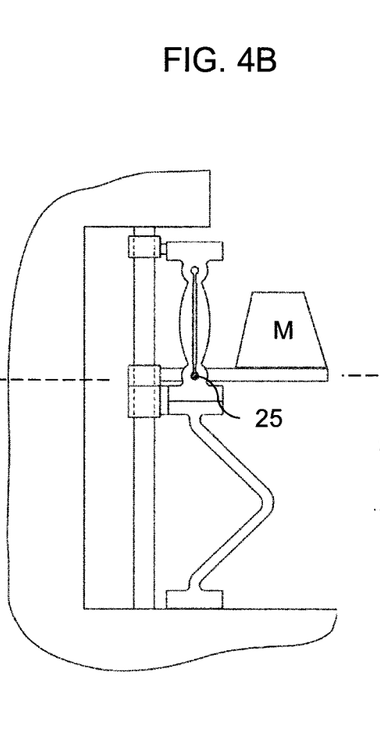
FIGS. 4B and 4C are sequential representations of the installed device of FIG. 4A after the completion of first and second stage strokes respectively.
Figure 4C:
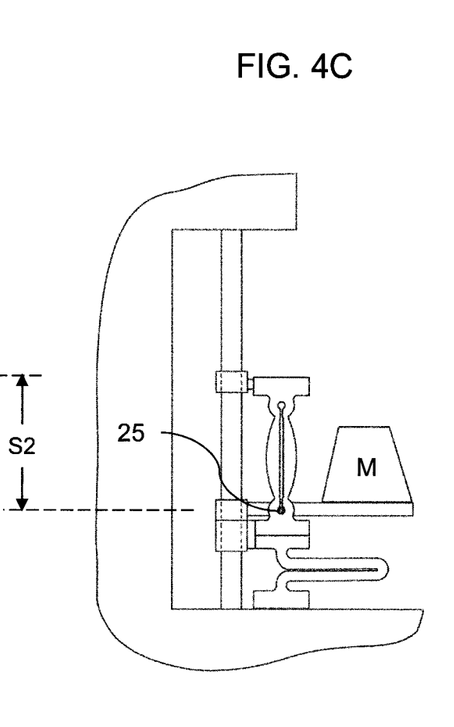

FIGS. 4A through 4C depict a guided embodiment of the EA mechanism sequentially at the beginning, middle, and end of a two-stage stroke event. Turning first to FIG. 4A, the EA mechanism 1 in operation forms part of a load path between a mobile structure 27, and a mass 29 supported by the mobile structure. The mobile structure 27 may be a vehicle, aircraft, watercraft, spacecraft, or other machine or construction exposed to external forces during normal use, and potentially very high external forces in certain extreme or catastrophic circumstances. In one exemplary embodiment the structure 27 is a vehicle, and the mass 29 is a seat configured to displace, or stroke relative to the vehicle under extreme loading conditions. Acceleration of the mobile structure, such as that caused by an explosion occurring adjacent to or under a vehicle, will result in an inertia force as the mass reacts to the acceleration imparted to it by the structure, and is itself accelerated. Because the EA mechanism is in the load path, the acceleration induced inertia force between the mass and structure is realized as a reaction load at the EA mechanism.

The EA mechanism is configured to limit the maximum acceleration experienced by the mass when the structure is subjected to a such a high energy, explosive, or otherwise catastrophic external structure loading event, referred to herein interchangeably as a "high energy impact event", or "impact event", or "high energy event". Such an event is further intended to mean generally one with enough energy to accelerate the structure at a rate sufficient to produce a mass acceleration that is substantially above an allowable level. Such impact events are typically described and defined in terms of an acceleration profile that goes from zero to a peak and back to zero within a matter of milliseconds, in which the peak acceleration value is much greater than any allowable human acceleration level, and typically more than twice the defined allowable. With respect to the present invention, the practical effect is a near instantaneous step increase in the structure to mass closing velocity from zero to some peak value. In the case of an under-vehicle explosion event for example, the vehicle (structure) is nearly instantaneously accelerated upward toward the seat (mass) to a peak velocity, delivering the acceleration impulse to the seating system. Typical peak instantaneous closing velocities during such impact events may be in a range of about 150 to 400 inches per second. The EA mechanism acts to spread the resulting acceleration of the mass over a much larger time interval and distance than that experienced by the impacted structure.

Continuing with FIG. 4A, an end of constant load portion 3 of the EA mechanism is connected to the mobile structurer 27, and the mandrel 25 is connected to the supported mass 29. A guide system 30 constrains the mandrel and mass to move only along the direction of axis 10, as well as preventing the mandrel from moving out of the plane of the EA mechanism. The depicted guide system also constrains the frame 5 and the upper end of the constant load portion 3 to move as a unit along axis 10. It should be noted that the arrangement of FIG. 4A is purely arbitrary, and may be altered depending upon the constraints of a particular application without changing the scope or content of the invention. Specifically, portions 2 and 3 of the EA mechanism could instead be mounted to the mass 29, and the mandrel 25 connected to the mobile structure 27, with guide system 30 again ensuring only axial, in-plane movement. In either case, weight or inertia force between the mass and the structure in the direction of axis 10 is initially realized within the EA mechanism as a reaction force between the mandrel and portion 2 of the EA mechanism at the upper end of slot 9. Thus, relative motion between the mobile structure 27 and mass 29 in the direction of axis 10 requires either motion of the mandrel relative to frame 5, or compressive deformation of constant load portion 3.

The EA mechanism 1 is configured to resist such motion with a reaction force according to a predefined, two-stage relationship between force and the displacement of the mass 29 relative to structure 27. As discussed in more detail below, this relationship may be presented as a load plot exhibiting a "notched" profile behavior in a first stage portion of an impact event, and a constant, or fixed load EA behavior in a second stage portion of the event. Such systems that vary the reaction load profile in a predefined manner are sometimes referred to as "fixed profile energy attenuating", or "FPEA", as contrasted with systems intended to maintain a constant load throughout the entire stroke. In certain applications fixed profile attenuation can be utilized to achieve greater energy absorption efficiency than possible with a purely constant load system, particularly when the mass being accelerated is a human body.

EA mechanism 1 is such an FPEA that uniquely combines a first portion specifically configured to produce a notched load profile through metal deformation energy attenuation, with a second portion specifically configured to produce a constant load profile, also through metal deformation energy attenuation. In one embodiment the reaction load profile is selected or optimized specifically to maximize overall energy attenuation efficiency of the first and second stage strokes combined, while ensuring that a peak acceleration experienced at the vertebral spine of a human occupant in a seat supported by the shock attenuation device does not exceed an allowable level.

Like the constant load portion 3, the notch load portion 2 of the EA mechanism is also configured to remain substantially rigid and prevent any relative movement between the structure and mass so long as the magnitude of a reaction load between structure and mass is less than a predetermined first threshold load value. If the first threshold load is reached, such as may occur in an explosive impact event, the frame 5 is configured to bend and deform under the resulting mandrel pressure, allowing the mandrel to forcibly advance into the slot 9, and continue advancing given sufficient event energy until eventually bottoming out at the end of the slot. FIG. 4B depicts the eventual end of such a first stage stroke, showing again the guided embodiment of FIG. 4A, but now with the mandrel at the lower mandrel cavity 18, and the mass 29 having stroked downward by a first stage stroking distance, indicated at S1".'

The constant load portion 3 of the EA mechanism is configured to remain substantially rigid and undeformed until a reaction load reaches a predefined second threshold value that is measurably higher than the first threshold value. Since the notch load portion 2 limits the reaction load to the first threshold value, the constant load portion 3 will remain rigid and undeformed throughout the first stage portion of the stroke. Once the first stage is complete and the mandrel is bottomed out against the top of the constant load portion, as in FIG. 4B, the reaction load will sharply ramp up until it reaches the second threshold value, initiating the second stage of the stroke. Again assuming sufficient event energy to maintain a reaction load at the second threshold value, constant load portion 3 will continue to plastically deform and collapse in a predictable manner, allowing the mass and structure to eventually displace relative to one another by a second stage amount.

FIG. 4C depicts the guided embodiment at an eventual end of such a second stage stroke. At this point the constant load portion 3 has fully collapsed, while the mass 29 and the notch load portion 2 have both stroked downward by the additional second stage amount "S2" for a combined first and second stage stroke length of S1+S2.

The threshold loads are selected based on the maximum acceleration, sometimes expressed as a number of G's, that can be safely experienced by the mass, or experienced without causing unacceptable damage or injury. For example, in a vehicle seat application in which the seat is configured to stroke relative to the vehicle during a blast or impact event, the threshold load may be based on a maximum allowable acceleration of the seat. In such cases the magnitude of the associated threshold load may be selected so as to ensure the acceleration experienced by a seated occupant having a weight within a specified range does not exceed the allowable number of G's. Accordingly in such cases the threshold load is dependent upon the anticipated weight or weight range of the occupied seat.

Figure 5:
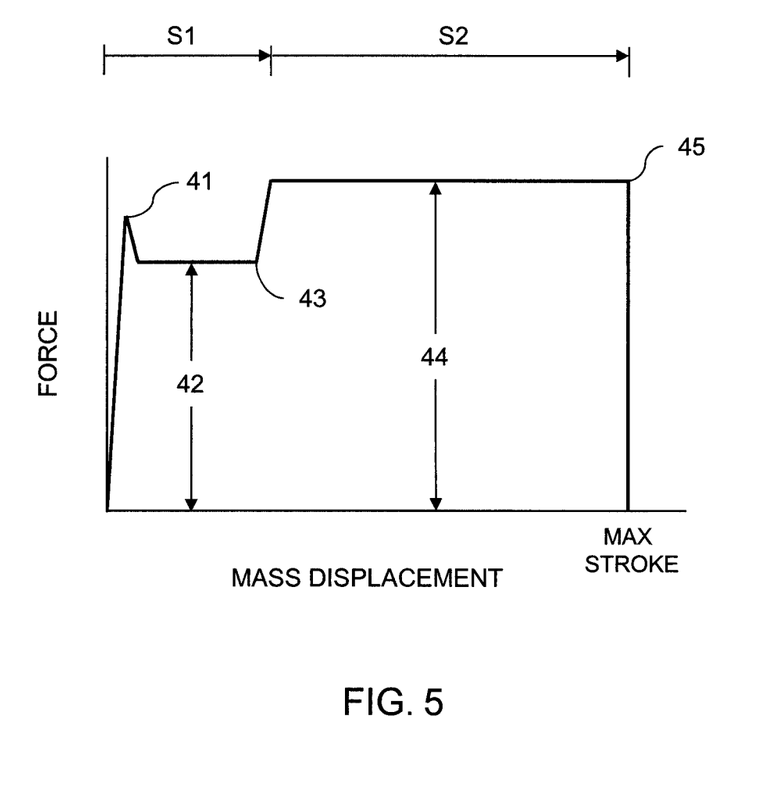
FIG. 5 is an exemplary plot showing reaction force of the energy attenuating device versus relative mass displacement during an impact event in which the load path goes through the EA mechanism.

FIG. 5 is an exemplary plot showing EA mechanism reaction force versus relative mass displacement during an impact event in which the load path goes through the EA mechanism 1. The plot is divided into a first stage portion for the displacement of the mandrel 25 relative to the frame 5, or S1, and a second stage portion for deformation of the constant load portion 3, or S2. The first stage portion represents a notch load profile defined by an initial spike load 41 at the first threshold load value, and a notch load 42 that is significantly less than the spike load. The notch load portion 2 of the EA mechanism is configured to produce this reaction load profile in response to an impact loading event.

In particular, at the onset of an impact event the reaction load in notch load portion 2 quickly ramps up over a relatively short distance as the structure is accelerated by the initial energy impulse. Upon reaching the first threshold load value 41, mechanical stresses within the frame 5 proximate the notch entry zone 12 caused by the mandrel attempting to spread the slot surpass the frame material yield strength, quickly reaching a state of gross cross-section yielding. The ensuing plastic deformation of the frame prevents the load from increasing further as the entry zone 12 spreads and the mandrel advances.

Upon exiting the entry zone, the mandrel enters the upper end of the notch load zone 13 of slot 9 where the reaction force quickly drops off to the notch load value 42. In one embodiment the entry zone 12 and upper end 6 of the frame are configured to result in effectively no measurable dwell time or corresponding mandrel displacement at the spike load value during a high energy impact event. The notch load zone 13 is configured to maintain the reaction force at the notch load value through plastic deformation of the frame as the mandrel traverses the length of the notch load zone. The outside edge 8 of the frame may be contoured to produce a frame cross-sectional shape configured to produce a substantially uniform degree of plastic deformation, and corresponding uniform resistance to advancement of the mandrel along the notch load zone. For example, the frame outer edges 8 may have an arcuate profile as shown, giving the sides substantially more width at the middle portion of constant load zone compared to the ends.

The first stage stroke ends as the mandrel reaches the lower end of slot 9 and eventually bottoms out against the upper end of constant load portion 3 of the EA mechanism, signified on FIG. 5 at reference numeral 43. From that point the reaction load again sharply increases until reaching the second threshold load value 44, initiating plastic deformation of the constant load portion 3 and the second stage stroke. The ensuing deformation of the constant load portion over the second stage stroke maintains the reaction load at the second threshold value, as the mandrel and the notch load portion 2 displace together along the stroking direction.

Given enough physical space, or total available stroke length between the mass and the structure to reach the point at which the event energy has been fully absorbed, deformation of the EA mechanism and motion of the mass relative to the structure (or closing velocity) will stop. Such an end point is indicated on the right side of FIG. 5 at reference numeral 45. If the event energy is absorbed in less than the available stroke, efficiency is lost, resulting in higher than necessary G loading of the mass. Conversely, if event energy is not exhausted in the available stroke length, the mass can bottom out against the structure 27, causing acceleration (or deceleration) to spike and exceed allowable levels. To minimize such loss of efficiency and acceleration spikes, the EA mechanism may be configured to perform optimally for a certain mass weight, or range of mass weights.

In the previously mentioned vehicle application for example, the EA mechanism may be configured to perform at an adequate level of efficiency for seat occupants that fall within a specified weight range, or within a specified percentile range for a fully loaded soldier as specified in various military standards. Achieving the desired efficiency may be accomplished by selectively combining certain design elements of the notch load portion 2, such as the frame material, frame length, slot width, etc., with design elements of the constant load portion 3, such as material type, thickness, or shape, to produce the desired threshold loads and load profile.

Moreover, the EA mechanism may be configured such that one or more of the design elements may be changed or adjusted in order to optimize efficiency for a particular seat loading condition, or range of conditions. For example, the mechanism may be equipped with an adjustable mandrel operable to selectively determine the value of the first threshold and notch loads. In one such embodiment the mandrel is an assembly of at least two pieces configured to be moveable relative to one another to increase or decrease the overall width of the mandrel. In another embodiment the mandrel is a rod or bar with a width or diameter that tapers or changes in steps along its length, coupled with an adjustment mechanism configured to selectively position a desired portion of the bar within the frame slot.

The EA mechanism may be further configured to passively or actively sense the static weight of a mass 29, and automatically adjust a design parameter affecting the threshold load. Those skilled in the art will appreciate that various other adjustment concepts or combinations thereof may be employed to produce a desired change in a threshold load of the EA mechanism, and are considered foreseeable alternatives within the scope of the present invention.

In addition, although the notch load portion of the EA mechanism has been described herein with reference to the depicted slotted frame embodiment, any type of suitable metal deforming device configured to allow displacement of a supported mass according to a defined load profile may be used instead. For example, one such suitable alternative in the form of another slotted device is described in pending U.S. patent application Ser. No. 15/729,377, assigned to the assignee of the present disclosure, and incorporated herein by reference. The disclosed device is a rigid frame with juxtaposed rows of deformable teeth defining a slot through which a mandrel is forced under impact event loading conditions. The notch load profile may be achieved by selectively varying the mechanical resistance of the teeth to advancement of the mandrel in specific regions of the slot. In particular, the teeth rows may comprise three sections, with a first section of teeth configured to produce a brief initial spike load at a first threshold load value, a second set of teeth configured to produce a constant load at a notch load value below the first threshold load value, and a third set of teeth configured to produce a constant load for the remainder of the mandrel stroke at a second threshold value that is higher than the first threshold value.

For the purposes of describing and defining the present invention it is noted that the use of relative terms, such as "substantially", "generally", "approximately", and the like, are utilized herein to represent an inherent degree of uncertainty that may be attributed to any quantitative comparison, value, measurement, or other representation. These terms are also utilized herein to represent the degree by which a quantitative representation may vary from a stated reference without resulting in a change in the basic function of the subject matter at issue.

Exemplary embodiments of the present invention are described above. No element, act, or instruction used in this description should be construed as important, necessary, critical, or essential to the invention unless explicitly described as such. Although only a few of the exemplary embodiments have been described in detail herein, those skilled in the art will readily appreciate that many modifications are possible in these exemplary embodiments without materially departing from the novel teachings and advantages of this invention. Accordingly, all such modifications are intended to be included within the scope of this invention as defined in the appended claims.

In the claims, any means-plus-function clauses are intended to cover the structures described herein as performing the recited function and not only structural equivalents, but also equivalent structures. Thus, although a nail and a screw may not be structural equivalents in that a nail employs a cylindrical surface to secure wooden parts together, whereas a screw employs a helical surface, in the environment of fastening wooden parts, a nail and a screw may be equivalent structures. Unless the exact language "means for" (performing a particular function or step) is recited in the claims, a construction under § 112, 6th paragraph is not intended. Additionally, it is not intended that the scope of patent protection afforded the present invention be defined by reading into any claim a limitation found herein that does not explicitly appear in the claim itself.

What is claimed is:

1. A shock attenuation device configured to operate between a structure and a mass that is supported by and moveable relative to the structure in a guided manner along a stroking direction, the shock attenuation device comprising:
   a notch load portion configured to attenuate energy by providing a resisting force to displacement of the supported mass relative to the structure over a first stage stroking distance according to a predefined load profile, wherein the predefined load profile comprises a spike load having a peak at a first threshold load value corresponding to an onset of a relative displacement, and a substantially constant load for a remainder of the predefined load profile, and wherein the substantially constant load is less than the spike load;
   a constant load portion serially arranged with the notch load portion, the constant load portion configured to provide a substantially constant resisting force to displacement of the supported mass relative to the structure at a second threshold load value over a second stage stroking distance, wherein the second threshold load value is higher than the first threshold load value; and
   wherein both the notch load and constant load portions of the shock attenuation device are metal constructions that attenuate energy through permanent plastic deformation of the metal, and the notch load portion comprises an elongated metal plate with a central longitudinal slot extending substantially from an upper end of the plate to a lower end, the upper end opening into an enlarged cavity configured for receiving a mandrel, wherein a width of the mandrel as measured in a plane of the plate is greater than a width of the slot.

2. The shock attenuation device of claim 1, wherein the second stage stroking distance is greater than the first stage stroking distance.

3. The shock attenuation device of claim 2, wherein the resisting forces of the notch load and constant load portions together define a reaction load profile selected to maximize overall energy attenuation efficiency of the first and second stage strokes combined while ensuring that a peak acceleration experienced at the vertebral spine of a human occupant in a seat supported by the shock attenuation device does not exceed an allowable level.

4. The shock attenuation device of claim 1, further comprising an entry zone at the upper end of the slot having a width less than the width of the slot, and configured to resist advancement of the mandrel into the slot with a force peaking at the first threshold load value.

5. The shock attenuation device of claim 4, wherein the entry zone is configured to result in effectively no measurable dwell time at the spike load value in the first stage stroke.

6. The shock attenuation device of claim 1, wherein the constant load portion comprises an angular metal bar integrally disposed between upper and lower flanges.

7. The shock attenuation device of claim 1, wherein the mass and the shock attenuation device are constrained by a guide mechanism to move only in the stroking direction.

8. A shock attenuation device configured to support a vehicle seat mounted for guided movement relative to a vehicle along a stroking direction, the shock attenuation device comprising:
an elongated metal frame configured to attenuate energy during a first stage stroke by providing a resisting force to relative displacement of the seat over a first stage stroking distance according to a predefined load profile, wherein the predefined load profile comprises a spike load having a peak at a first threshold load value corresponding to an onset of relative displacement, followed by a substantially constant notch load for a remainder of the predefined load profile; and
a deformable member, serially arranged with the elongated metal frame, and configured to provide a substantially constant resisting force during a second stage stroke to relative displacement of the seat at a second threshold load value over a second stage stroking distance, wherein the second threshold load value is higher than the first threshold load value; and
wherein the elongated metal frame has a longitudinal slot that extends from a first end of the longitudinal slot proximate a first end of the elongated metal frame to a second end of the longitudinal slot proximate a second end of the elongated metal frame, substantially dividing the elongated metal frame into left and right halves, the longitudinal slot configured to receive a mandrel that is wider than the longitudinal slot, and connected to one of the seat and the vehicle at the first end of the longitudinal slot.

9. The shock attenuation device of claim 8, wherein the longitudinal slot has a constricted entry zone configured to resist advancement of the mandrel with a force that peaks at the first threshold value, and a notch load zone configured to resist advancement of the mandrel with a constant force substantially below the first threshold value.

10. The shock attenuation device of claim 9, wherein the entry zone is configured to result in effectively no measurable relative displacement at the spike load value, and the notch load zone accounts for the remainder of the relative displacement occurring in the first stage stroke.

11. The shock attenuation device of claim 8, wherein the second stage stroking distance is greater than the first stage stroking distance.

12. The shock attenuation device of claim 11, wherein the resisting forces of the elongated metal frame and the deformable member together define a reaction load profile selected to maximize overall energy attenuation efficiency of the first and second stage strokes combined while ensuring that a peak acceleration experienced at the vertebral spine of a human occupant in the seat does not exceed an allowable level.

13. The shock attenuation device of claim 8, wherein the elongated metal frame and a first end of the deformable member are constrained by a guide system to move as a unit, and a second end of the deformable member is configured for attachment to the other of the seat and vehicle.

14. The shock attenuation device of claim 8, wherein the left and right sides of the elongated frame are symmetrical, with an outer contour of the left and right sides selected to produce a substantially constant resisting force against advancement of the mandrel over the entire length of the notch load zone.

15. A method of attenuating shock loads imparted to a mass mounted for guided movement relative to a structure along a stroking direction, the method comprising the steps of:
resisting relative displacement of the mass and structure with a notch load portion of an energy attenuating device over a first stage stroking distance, the notch load portion of the energy attenuating device comprising an elongated metal frame with a longitudinal slot configured to receive a mandrel that is wider than the slot and connected to one of the mass and the structure at a first end of the slot, wherein a first stage resisting force follows a predefined load profile that includes a spike load peaking at a first threshold load value at the onset of relative displacement, and a substantially constant notch load for a remainder of the first stage stroking distance; and
resisting further relative displacement of the mass and structure with a deformable member serially arranged with the elongated metal frame, and configured to provide a substantially constant resisting force at a second threshold load value over a second stage stroking distance, wherein the second threshold load value is higher than the first threshold load value.

16. The method of claim 15, wherein the mass is a seat, and the resisting forces over the first and second stage stroking distances together define a reaction load profile selected to maximize overall efficiency of the energy attenuating device while ensuring that a peak acceleration experienced at the vertebral spine of a human occupant in the seat does not exceed an allowable level.

* * * * *